Aug. 28, 1962  H. A. LARBERG  3,051,390
APPARATUS FOR ANALYZING VOLUME OF GAS IN GAS PIPE LINES
Filed May 1, 1958  3 Sheets-Sheet 1

INVENTOR.
Harlan A. Larberg.
BY
Fishburn and Gold
ATTORNEYS.

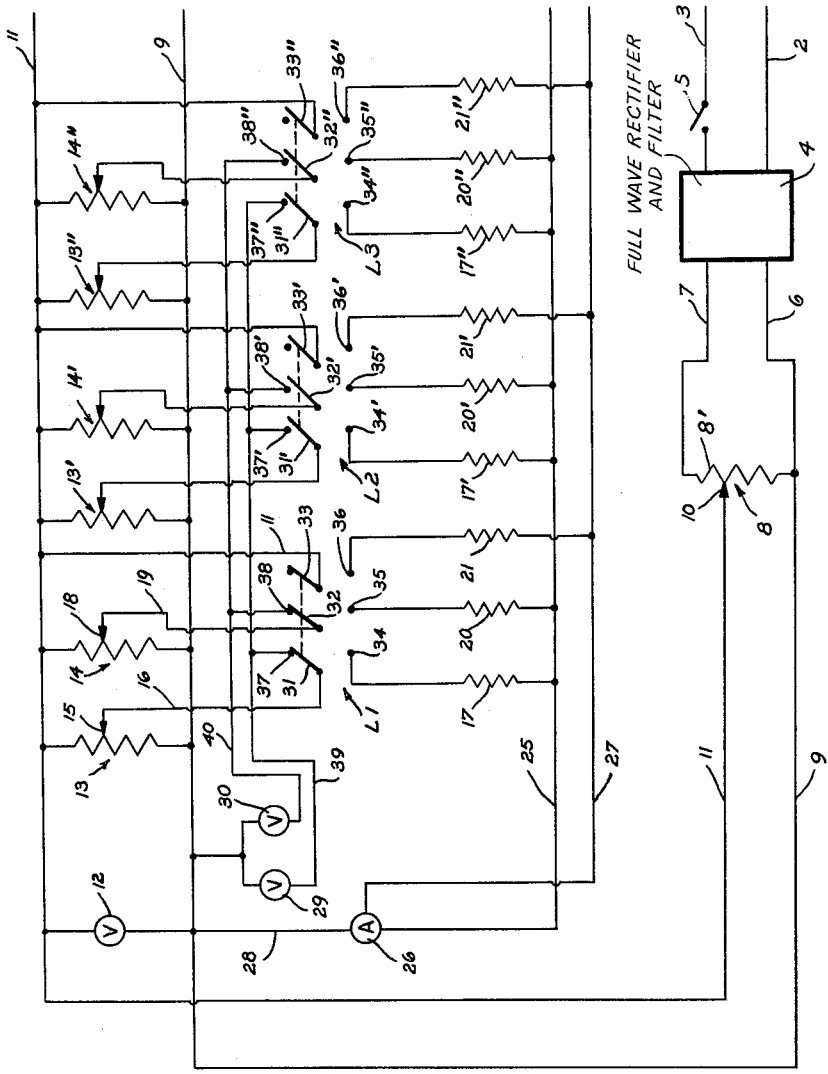

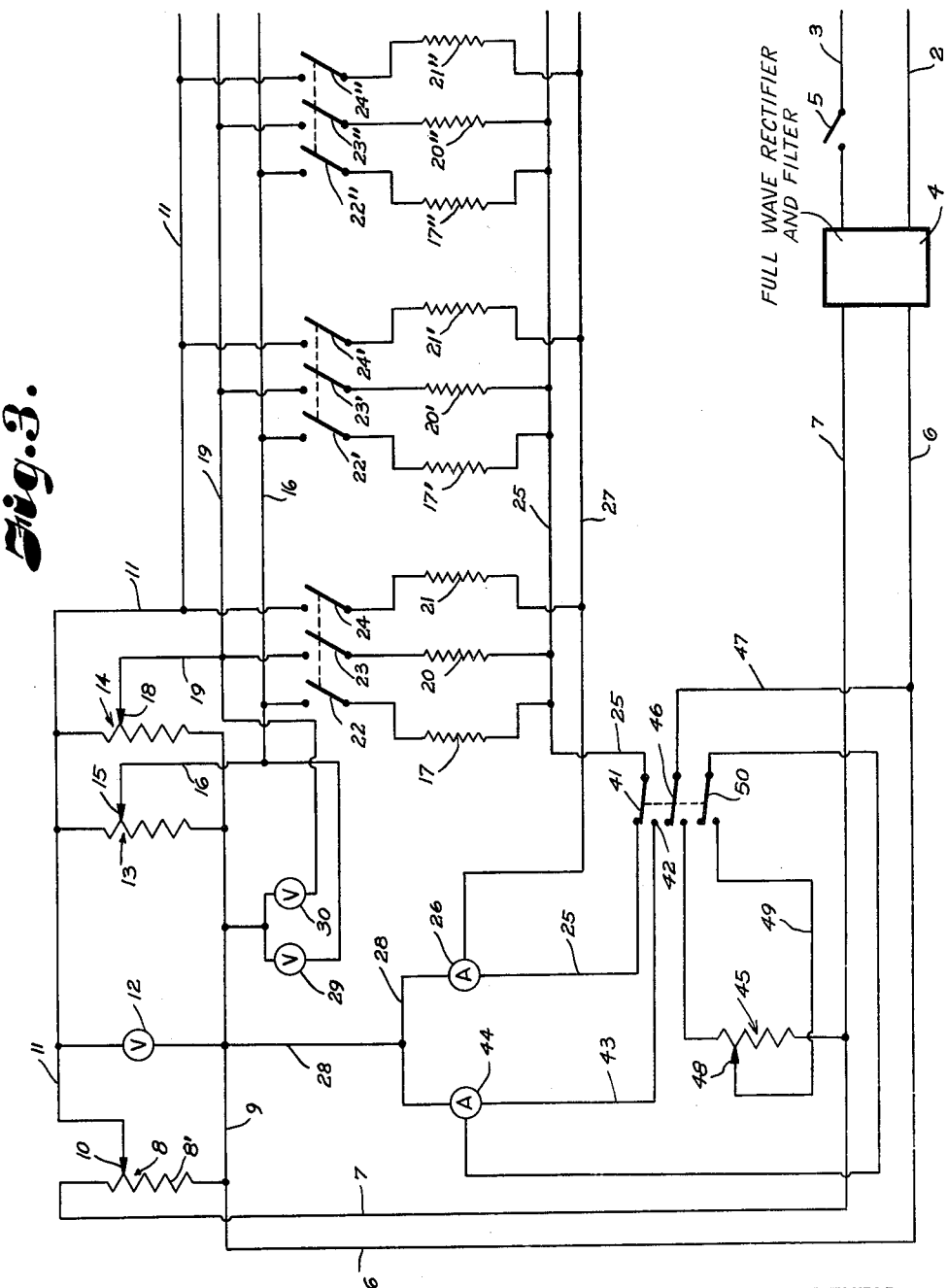

3,051,390
Patented Aug. 28, 1962

3,051,390
APPARATUS FOR ANALYZING VOLUME OF GAS IN GAS PIPE LINES
Harlan A. Larberg, Kansas City, Mo., assignor to Panhandle Eastern Pipeline Company, Kansas City, Mo., a corporation of Delaware
Filed May 1, 1958, Ser. No. 732,352
4 Claims. (Cl. 235—185)

This invention relates to the analyzing of gas pipe lines, and more particularly to a novel method and apparatus for analyzing the pack or volume of gas contained in a gas pipe line under various conditions of pressure.

Under ordinary conditions of natural gas service, the peak demands during a cold day may call for a delivery rate two or three times the average daily rate, and possibly many times the minimum rate. In spite of this, however, it is not necessary to use a gas holder to equalize the load inasmuch as the pipe line itself performs a similar service because of the compressibility of the gas. When the demand drops off, the supply at the intake end is maintained, resulting in the building up of the pressure all along the line due to the surplus gas forced into it. This surplus constitutes the storage capacity of the line. It is common practice to operate large, long distance gas transportation lines at relatively high pressures in order to pass a maximum quantity of gas and maintain a substantial reserve or surplus in the line to satisfy peak delivery rates.

The efficient operation of a gas pipe line system, and the maintenance of suitable supply and reserves therein, has heretofore been handicapped by the necessity of making time-consuming mathematical calculations to determine the actual amount or volume of gas present in the sections between pumping stations or other division points in the pipe line, and then adding the sectional quantities to obtain the total reserve or pack in the entire pipe line or certain portions thereof. Some pipe lines are complex in that they include sections having loops or connected parallel lines and other sections of single lines, as well as different sized pipes in the different sections, making it necessary to compute the storage capacity of each individual section for the pressures prevailing at the extremities of the individual pipe line section of length.

Numerous mathematical expressions for pipe line flow and quantity of gas contained in a line are in practical use. One flow formula is given in "Flow of Natural Gas Through High Pressure Transmission Lines," by T. W. Johnson and W. B. Berwold, U.S. Bureau of Mines Monograph 6, 1935. The formula given in terms common to the gas industry is:

$$Q_f = 38.774 \frac{T_0}{P_0}\left[\frac{(P^2_1 - P^2_2)D^5}{FGT_f X}\right]^{1/2}$$

(Equation #1)

Herein:

$Q_f$ = flowing quantity in million cubic feet.
$D$ = diameter of line in inches.
$X$ = length of line in miles.
$T_0$ = temperature degrees F. absolute.
$P_0$ = standard pressure in pounds per square inch absolute.
$G$ = specific gravity.
$F$ = coefficient of friction.
$T_f$ = flowing temperature.
$P_1$ = upstream pressure.
$P_2$ = downstream pressure.

The mean pressure of a segment of a pipe line can be calculated by a formula derived from Equation #1.

$$P_m = 2/3 \frac{(P^3_1 - P^3_2)}{(P^2_1 - P^2_2)} \quad \text{(Equation \#2)}$$

where:

$P_1$ = upstream pressure (p.s.i.a.)
$P_2$ = downstream pressure (p.s.i.a.)
$P_m$ = mean pressure (p.s.i.a.)

The quantity of gas in the above-mentioned segment of pipe line is obtained from the fundamental gas formula:

$$Q_p = P_m U/P_0 Z(10^6) \quad \text{(Equation \#3)}$$

$Q_p$ = gas quantity (million cubic feet)
$P_m$ = mean pressure (p.s.i.a.)
$U$ = pipe line volume (cubic feet)
$P_0$ = standard pressure (p.s.i.a.)
$Z$ = compressibility constant at $P_m$ For a specific series of pipe line segments, the line pack can be calculated from Equation #3. It is possible to correlate the values to the formula:

$$Q_p = aP_1 + bP_2 + c \quad \text{(Equation \#4)}$$

Herein:

$Q_p$ = quantity of gas in pipe line section (line pack) between selected points in million cubic feet.
$P_1$ = inlet or upstream pressure in pounds per square inch.
$P_2$ = outlet or downstream pressure in pounds per square inch.
$a$ = constant.
$b$ = constant.
$c$ = negative constant.

The constants $a$, $b$ and $c$ depend upon the physical dimensions of the segments making up the pipe line section between compressor stations or terminal points. A section as, for example, between two pumping stations, may be of various lengths as, for example, 100 miles, and then the pressure $P_1$ would be the pressure at the discharge side of the upstream pumping station and the pressure $P_2$ would be the inlet pressure at the downstream pumping station. After determining the volume of the pipe line section, the gas flow therefrom at a wide range of upstream and downstream pressures, the aforementioned Formula #3 is solved over a range of $P_1$ and $P_2$ pressures to obtain the various line packs or $Q_p$'s, and that data is then correlated with the equation:

$$Q_p = aP_1 + bP_2 + c$$

whereby the constants $a$, $b$ and $c$ are determined solely by the correlation and depend upon the basic pipe line size and length, the correlation being applied to the specific line section in question. After the constants are obtained, then the line pack may be calculated for the pipe line section at the various $P_1$ and $P_2$ pressures.

This invention relates to an improvement in electrical analyzers for simulating the values of the pressures whereby they may be set on meters and the line pack read on another meter in the electrical analyzer. An object of the present invention is to provide a superior method and apparatus of analyzing and determining gas flow pipe line pack wherein the solutions for the wide variety of pressure differentials will give the line pack in the pipe line section directly and accurately without requiring tedious computation.

A further object of the invention is to provide an electrical analyzer having voltage varying potentiometers or voltage dividers and voltmeters in circuit with resistances and an ammeter whereby the meters are calibrated for direct setting of the pressures on the voltmeters and the reading of the line pack in millions of cubic feet from the ammeter.

It is a further object of the present invention to provide a plurality of resistances and switches with values for respective pipe line sections whereby the line pack in each of the sections may be determined and directly read.

It is also an object of the present invention to provide an electrical analyzer for line pack in pipe line sections whereby the cumulative pack in the sections can be determined and the total pack in a plurality of sections determined.

Other objects and advantages of this invention will become apparent from the following description taken in connection with the accompanying drawings wherein are set forth by way of illustration and example certain embodiments of this invention.

FIG. 2 is a schematic view showing the electrical circuit of a modified form of line pack electrical analyzer for determining the line pack in each of a plurality of pipe line sections and also the total line pack in all of said sections.

FIG. 3 is a schematic view of the electrical apparatus of a further modified form of analyzer that also determines the change of pack resulting from change in either or both of the upstream and downstream pressures.

Figure 1:
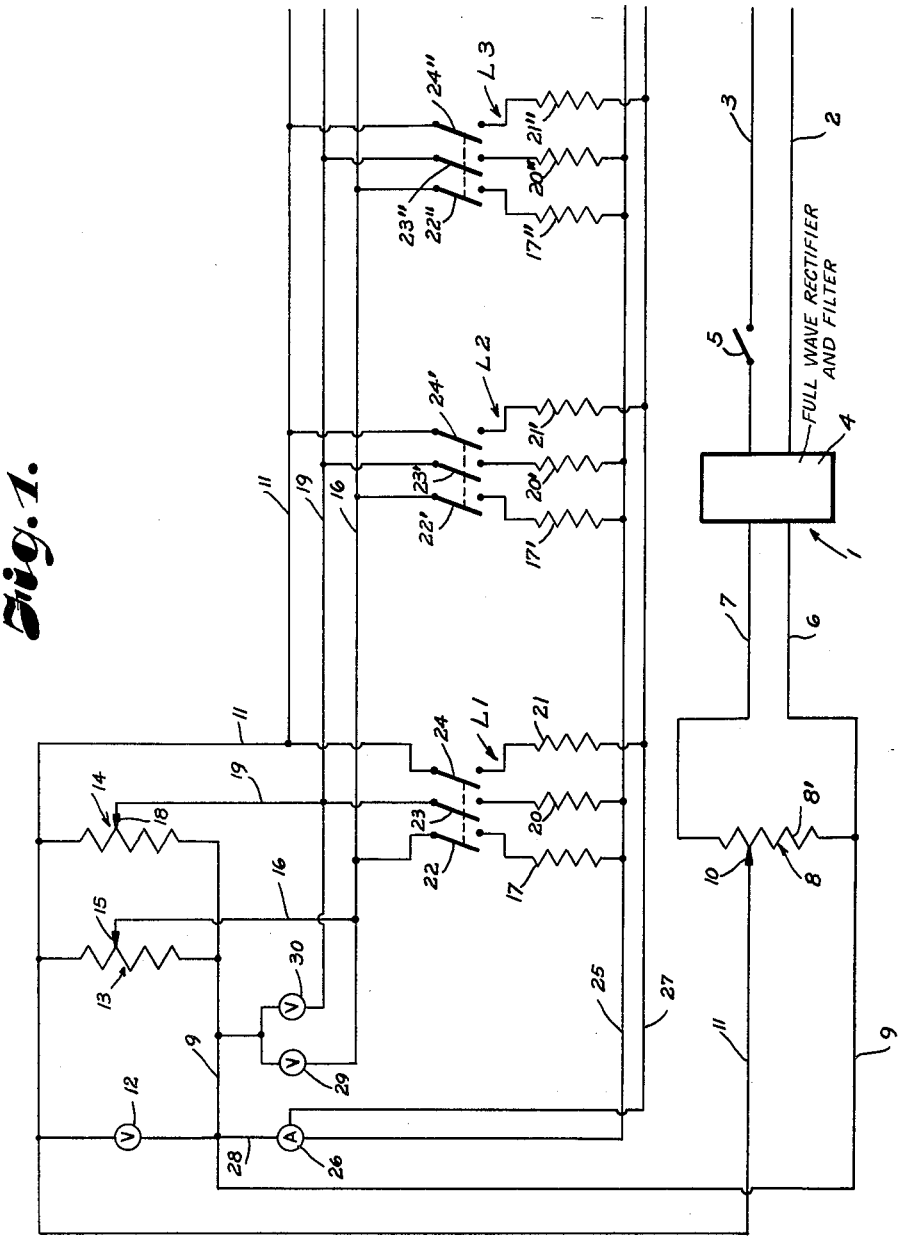
FIG. 1 is a schematic view of an electrical analyzer for selectively determining the line pack in certain pipe line sections.

Referring more in detail to the drawings:

1 designates a power supply for the electrical line pack analyzer illustrated in FIG. 1 to provide a source of constant voltage direct current. In the power supply illustrated, a source of electrical power, such as ordinary A.C. power supply, is connected through leads 2 and 3 to a full wave rectifier and filter 4, the main control switch 5 being located in the lead 3. It is to be understood that a battery or other suitable source of D.C. current may be used. The output of the rectifier and filter is delivered through conductors 6 and 7 to a voltage divider or potentiometer 8. One end of the coil or resistance 8' of the potentiometer is connected to a conductor 9 and the sliding contact 10 of the potentiometer or voltage divider is connected to a conductor 11. A voltmeter 12 is connected across the conductors 9 and 11 to indicate the voltage from the voltage divider 8 whereby it can be checked to be sure it is constant and the desired value, said voltage preferably being in the nature of 24 volts. The conductors 9 and 11 are also connected to voltage varying potentiometers or voltage dividers 13 and 14, the coils or resistances thereof being in parallel circuit. The sliding contact 15 of the potentiometer 13 is connected by a conductor 16 to one end of a fixed resistance 17 and the sliding contact 18 of the potentiometer 14 is connected by a conductor 19 to one end of a fixed resistance 20. The conductor 11 is connected to one end of a fixed resistance 21. Coupled switches 22, 23 and 24 are in the conductors 16, 19 and 11 adjacent said one end of the resistances 17, 20 and 21, respectively. The other end of the resistances 17 and 20 are connected by a conductor 25 to a differential current ammeter 26, and the other end of the resistance 21 is connected by a conductor 27 to said ammeter 26, said ammeter being connected by a conductor 28 to the conductor 9 whereby the differential current ammeter 26 is connected in the circuit to provide a reading of amperage that is equal to the current from the resistance 17 plus the amperage of the current from resistance 20 minus the amperage of the current from the resistance 21.

A voltmeter 29 is connected in the circuit with the potentiometer 13 to show the voltage therefrom to be applied to the resistance 17, said voltmeter being connected between the conductor 16 and the conductor 9. A voltmeter 30 is connected in circuit with the potentiometer 14 to show the voltage therefrom to be applied to said resistance 20, the voltmeter 30 being connected between the conductors 19 and 9. In the circuit, the resistances 17, 20 and 21 are selectively connected in the circuit by the switches 22, 23 and 24 respectively, and are arranged as later described to provide a pack determination for one section of a gas pipe line. The circuit is arranged for selectively determining the pack in other line sections, and as for a second line section, resistances 17', 20' and 21' with corresponding switches 22', 23' and 24' are arranged between the conductors 16, 19 and 11 and conductors 25 and 27 whereby the group is in parallel circuit with the group for the first line section. In the same manner, similar components are connected for additional line sections, as, for example, for a third line section resistances 17", 20" and 21" with corresponding switches 22", 23" and 24" are connected in parallel circuit with the group of the first line section between the conductors 16, 19 and 11 and conductors 25 and 27.

The values of the various components in the circuit are calculated from the formula $Q = aP_1 + bP_2 + c$, with the constants $a$, $b$ and $c$ determined for the particular line section in question. In each of the calculations of such constants, it has been found that the constant $c$ is always a negative value. It has been discovered that in the electrical analogy, the ohm value indicated as $R_1$ of the resistance 17 is the reciprocal of the constant $a$, or $$\frac{1}{a} = R_1$$

in ohms, or $$a = \frac{1}{R_1}$$

in mhos (units of conductance). The ohm value, designated $R_2$ of the resistance 20, is the reciprocal of the constant $b$, or $$\frac{1}{b} = R_2 \text{ in ohms}$$

or $$b = \frac{1}{R_2}$$

in mhos (units of conductance). The ohm value designated $R_3$ of the resistance 21 is $$\frac{V}{c}$$

where V is the voltage supplied by the potentiometer 8, for example 24 volts, or $$\frac{V}{c} = R_3$$

in ohms, or $$c = \frac{V}{R_3}$$

in milliamps. The voltmeters 29 and 30 each have a scale calibrated in pounds per square inch as, for example, each of the voltmeters may have a range of from 0 to 15 volts, and the calibration be such that they would read from 0 to 1500 pounds per square inch, each volt being the equivalent of 100 pounds per square inch with the relationship between the volts and pressure being a linear relation.

The ammeter 26 preferably has a range of from 0 to 100 milliamps. and is calibrated to read from 0 to 100 million cubic feet, one milliamp. being equivalent to one million cubic feet, the graduation being in a linear relation.

In the electrical analogy of the formula $$Q = aP_1 + bP_2 + c$$

$Q = I$ current milliamps. read on meter 26.
$P_1 = V_1$ voltage in volts voltmeter 29.
$P_2 = V_2$ voltage in volts on voltmeter 30.

$$a = \frac{1}{R_1} \text{ mhos}$$

$$b = \frac{1}{R_2} \text{ mhos}$$

$$c = \frac{V}{R_3} \text{ current in milliamps}$$

The voltage applied through the conductors 9 and 11 must be held constant and is checked by the voltmeter 12. The potentiometer 8 provides for adjusting of this voltage to the desired amount. By varying the potentiometer 13, the voltage applied to the resistance 17 may be varied, and since the voltmeter 29 is graduated in pounds per square inch, the potentiometer 13 is adjusted until the voltmeter 29 registers the pressure at the upstream end of the pipe line section in which the resistances 17, 20 and 21 are of the predetermined values relative to the constants $a$, $b$ and $c$ of that specific line section. Varying the potentiometer 14 adjusts the voltage applied to the resistance 20 which voltage actuates the voltmeter 30 whereby it reads in the pounds per square inch pressure at the downstream end of the specific line section. The potentiometers 13 and 14 are adjusted whereby the input and output pressures of the particular line section are read on the voltmeters 29 and 30 respectively, then the switches 22, 23 and 24 are closed and the algebraic sum of the three currents equal the desired total current which is read on the ammeter 26, and due to the calibrations, the reading is in millions of cubic feet of gas in the line section. By substituting the electrical symbols in the equation $Q = aP_1 + bP_2 + c$, the equation becomes:

$$I_t = \frac{1}{R_1} V_1 + \frac{1}{R_2} V_2 - \frac{V}{R_3}$$

or $$I_t = \frac{V_1}{R_1} + \frac{V_2}{R_2} - \frac{V}{R_3}$$

which can also be written as:

$$I_t = I_1 + I_2 - I_3$$

Herein:

$I_t$ = the total or algebraic sum of the current through the resistances 17, 20 and 21.
$I_1$ = the current drawn by resistance 17.
$I_2$ = the current drawn by the resistance 20.
$I_3$ = the current drawn by the resistance 21.

As the value of $c$ is negative in sign, the ammeter 26 is a differential ammeter to provide the algebraic sum of the three currents whereby the reading on the ammeter 26 gives the line pack in millions of cubic feet to satisfy the line pack equation for the measurement of Q therein. The values of the resistances corresponding to resistances 17, 20 and 21, must be calculated for each and every section of pipe line in which the pack is to be determined. In the structure illustrated in FIG. 1, the resistances 17, 20 and 21, and the corresponding switches 22, 23 and 24, are for testing a specific pipe line section, and for convenience, those components are designated $L_1$ meaning first line section. The resistances 17', 20' and 21' and switches 22', 23' and 24' are the components in the circuit having predetermined values in accordance with the constants $a$, $b$ and $c$ that have been determined for the second line section and, for convenience, the general components therefor are designated $L_2$. Correspondingly, $L_3$ designates the components of the circuit for the third line section wherein the resistances 17", 20" and 21" are predetermined in accordance with the constants $a$, $b$ and $c$ that have been determined for the third pipe line section.

In using the structure constructed as illustrated and described, the operator communicates with the check points at the ends of the particular line sections in which the pack is to be determined, and obtains the input and output pressures for the line section for which the components in the circuit designated $L_1$, $L_2$ and $L_3$ have been set up, then the operator closes switch 5 and checks the voltmeter 12 and adjusts the potentiometer 8 until the constant D.C. voltage applied to the conductors 9 and 11 is of the desired amount, for example, 24 volts. Then the potentiometer 13 is adjusted until the input pressure of the first line section corresponds to the reading of the meter 29. The potentiometer 14 is adjusted until the output pressure of the first line section is shown on the voltmeter 30. Then the switches 22, 23 and 24 for $L_1$ are closed and the reading of the differential ammeter 26 will show the millions of cubic feet of gas in the first line section, or, in other words, the pack of said pipe line section. The switches in the components $L_1$ are opened, and the potentiometers 13 and 14 adjusted whereby the meters 29 and 30 read in accordance with the input and output pressure respectively of the second line section. Then the switches 22', 23' and 24' in the components $L_2$ are closed and the second line section can be read on the differential ammeter 26 to show the millions of cubic feet of gas or the pack in said second line section. This same procedure is repeated for each of the line sections in which the pack is to be determined.

In the form of the invention illustrated in FIG. 2, the components corresponding to the components in the form illustrated in FIG. 1 are designated by the same reference numerals. In this form of the invention, there are separate potentiometers 13 and 14 for each line section in which the pack is to be determined, the potentiometers 13 and 14 being for the first line section, potentiometers 13' and 14' are for the second line section, and potentiometers 13" and 14" are for the third line section. In this form of the invention, the conductors 16 and 19 from the sliding contacts 15 and 18 respectively are connected to switch arms 31 and 32 respectively. The conductor 11 is connected to a switch arm 33, said switch arms 31, 32 and 33 being coupled and of the double throw type. When positioned for reading of the line pack, the switch arms 31, 32 and 33 are engaged with contacts 34, 35 and 36 respectively to complete the circuit through the resistances 17, 20 and 21, respectively. In the other position of the double throw switch arms, the switch arms 31 and 32 are engaged with contacts 37 and 38 to complete a circuit through conductors 39 and 40 respectively leading to the respective voltmeters 29 and 30 whereby in that position of the switches the voltmeters in effect are connected across the conductors 16 and 9 and 19 and 9 respectively. The portion of the circuit corresponding to the second pipe line section includes the potentiometers 13' and 14', the sliding contacts of which are respectively connected to the switch arms 31' and 32', the switch arm 33' being connected to the conductor 11.

The double throw switch for the second line section includes contacts 37' and 38' connected to the conductors 39 and 40 respectively, and in the other throw of the switch arms they engage contacts 34', 35' and 36' leading to the resistances 17', 20' and 21' respectively. In the components for the third line section, the potentiometers 13" and 14" are connected respectively to switch arms 31″ and 32″ with a switch arm 33″ connected to the conductor 11. In one position of the double throw switch arms, the switch arms 31″ and 32″ are engaged with the contacts 37″ and 38″ respectively which are connected to the conductors 39 and 40. At the other throw of the switch arms, said switch arms 31″, 32″ and 33″ are engaged respectively with the contacts 34″, 35″ and 36″ leading to the resistances 17″, 20″ and 21′.

In using an apparatus constructed and described as shown in FIG. 2, the operator receives the information from the check points relative to the pipe line sections as to the input and output pressures of the respective sections, and then closes switch 5 whereby current is supplied through the leads 2 and 3 to the full wave rectifying filter 4, the output of which is delivered to the potentiometer 8 which is adjusted to provide a constant D.C. voltage through the conductors 9 and 10, which voltage is read on the voltmeter 12 to be certain it is the desired voltage. Then, with the switches 31, 32 and 33 in the in the position illustrated in FIG. 2, the potentiometer 13 is adjusted whereby the input pressure of the first line section is read on the meter 29. The potentiometer 14 is adjusted whereby the output pressure of the first line section is read on the meter 30. Then the switches 31, 32 and 33 are moved to engage the contacts 34, 35 and 36 respectively and the line pack of the first line section is read on the meter 26 in the same manner as described relative to the form shown in FIG. 1. The switches 31, 32 and 33 are then moved to an open position. Then the switch arms 31′, and 32′ are moved into engagement with the contacts 37′ and 38′, and the potentiometers 13′ and 14′ are adjusted whereby the meters 29 and 30 will show the input and output pressures respectively of the second pipe line section. Then the switch arms 31′, 32′ and 33′ are moved into engagement with contacts 34′, 35′ and 36′ respectively whereby current is passed through the resistances 17′, 20′ and 21′ having values in accordance with the requirements for the pack determination of the second pipe line section. The line pack of said section is then read on the meter 26. Switch arms 31′, 32′ and 33′ are then moved to an open position, and the same procedure followed with the switch arms 31″, 32″ and 33″ and the potentiometers 13″ and 14″ to determine the line pack of the third line section. In this manner, the line pack of each individual section can be determined, and with the potentiometers for the respective sections remaining in the positions set for the respective pressures in determining the line pack of the individual sections, then the switches 31, 32 and 33 and the corresponding switches for each of the line sections, for example 31′, 32′ and 33′ for the second line section, are moved to apply current through the respective resistances for the respective line sections and then the total line pack for the combined line sections is read on the meter 26. It is to be understood in determining the total line pack any selected plurality of specific sections can be included in the total by the actuation of the respective switches for said specific line section to bring the resistances for said line section into the circuit.

In the form of the invention illustrated in FIG. 3, the circuit and components for determining the line pack in the individual specific sections corresponds to the structure illustrated and described relative to the form of the invention illustrated in FIG. 1, and the operation of the circuit to determine the individual section packs is the same. However, in the form of the invention illustrated in FIG. 3, there is a switch 41 interposed in the conductor 25 to interrupt the circuit through said conductor to the differential ammeter 26. The switch arm 41 is movable into engagement with a contact 42 connected by a conductor 43 to a second differential ammeter 44 whereby operation of the switch 41 connects the various resistances for the pipe line sections to the ammeter 44. The ammeter 44 also is connected to the conductor 9 in the same manner as the ammeter 26. A voltage divider or potentiometer 45 is connected across the conductors 6 and 7 in parallel circuit with the potentiometer 8 with a switch 46 in a conductor 47 connecting the potentiometer to the conductor 6 for interrupting the circuit to the potentiometer 45. The slide contact 48 of the potentiometer 45 is connected by a conductor 49 with the ammeter 44, a switch 50 being arranged in the conductor 49 to interrupt the circuit from the potentiometer to said ammeter 44. The ammeter 44 is a differential ammeter with a zero position in the middle of the scale and is calibrated as, for example, with one milliampere equal to one million cubic feet. In using the structure illustrated and described, the switch arms 41, 46 and 50 are in the position illustrated in FIG. 3. Then the line pack for the individual line sections is determined in the same manner as described relative to the structure illustrated in FIG. 1 as, for example, the potentiometer 13 is adjusted whereby the reading on the meter 29 shows the input pressure of the particular line section, and the potentiometer 14 is adjusted to show the output pressure of the said section on the meter 30. Then the switch arms 22, 23 and 24 are moved to circuit closing position whereby the current flows through the resistances 17, 20 and 21 through the conductors 25 and 27 to the meter 26 where the line pack is read on said meter in millions of cubic feet. Then the switch arms 41, 46 and 50 are moved to connect the resistances 17 and 20 through the switch arm 41 and conductor 43 to the ammeter 44, and also connect the potentiometer 45 to said ammeter, and then the slide contact 48 is adjusted to provide a zero reading of the ammeter 44. Then the switches 41, 46 and 50 are again moved to the position illustrated in FIG. 3, and the swtich arms 22, 23 and 24 moved to interrupt the circuit through the resistances 17, 20 and 21. The potentiometer 14 is then adjusted to show a decreased pressure on the meter 30. The switch arms 22, 23 and 24 are then moved to closed position, and the switch arms 41, 46 and 50 moved whereby the circuit is completed to the meter 44, and the meter 44 will then show the loss of pack in the line section that will result from the set decrease in the downstream or output pressure. In the same manner, both the upstream and downstream pressures may be varied, and the same procedure followed whereby the meter 44 will provide a reading to show the increase or decrease in the line pack that will result from the change in the upstream and downstream pressures of the pipe line section. By use of this structure and method of operation, the operator will be able to tell how much the pack will vary with various pressure changes.

It will be clear that the present invention in the electrical analyzer for line pack in gas flow lines is constructed and correlated with particular flow lines and sections thereof between pressure check points, and thereafter all computations and all guesswork is eliminated in determining the gas pack in the lines or line section. An operator using the present invention can quickly and easily determine actual line pack conditions in the pipe line, and also variations that may occur with a change of pressures, and then can alter the supply operations without delay so as to maintain maximum operation efficiency in the flow line.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What I claim and desire to secure by Letters Patent is:
1. In an apparatus for determining the line pack in gas flow line sections at selected input and output pressures comprising, an electric circuit having connected conductors, meters and resistances arranged to simulate pressure and flow conditions in the flow line section in which the pack is to be determined, a power source connected to said circuit, means in the circuit for adjusting the voltage applied to said circuit, first and second voltage dividers in said circuit, first and second voltmeters connected across the output of the first and second voltage dividers respectively to indicate the voltage of said respective outputs, said voltmeters each being calibrated in pressure in pounds per square inch whereby said meters each provide a reading in pressure proportionate to the voltage output of the respective voltage dividers, first, second and third resistances, means connecting the first and second resistances to the output of the voltage dividers, means connecting the third resistance in the circuit whereby said voltage applied to the circuit is applied thereto, and a differential ammeter calibrated in millions of cubic feet and in the circuit between the constant voltage source and the first, second and third resistances to measure the sum of the currents from the first and second resistances less the current from the third resistance whereby the reading on the differential ammeter corresponds to the volume of the gas in said flow line section.

2. In an apparatus for determining the line pack in gas flow line sections at selected input and output pressures comprising, an electric circuit having connected conductors, meters and resistances arranged to simulate pressure and flow conditions in the flow line section in which the pack is to be determined, a power source connected to said circuit, means in the circuit for adjusting the voltage applied to said circuit to a desired constant D.C. voltage, first and second voltage dividers in said circuit, first and second voltmeters connected across the output of teh first and second voltage dividers respectively to indicate the voltage of said respective outputs, said voltmeters each being calibrated in pressure in pounds per square inch whereby said meters each provide a reading in pressure proportionate to the voltage output of the respective voltage dividers, first, second and third resistances, means connecting the first and second resistances to the output of the voltage dividers, means connecting the third resistance in the circuit whereby said constant D.C. voltage is applied thereto, and a differential ammeter calibrated in millions of cubic feet and in the circuit between the constant voltage source and the first, second and third resistances to measure the sum of the currents from the first and second resistances less the current from the third resistance, said first, second and third resistances being of values that are electrical counterparts of factors involved in the capacity of said flow line section whereby setting of the first and second voltage dividers to provide readings on the first and second voltmeters corresponding to the input and output pressures respectively of the flow line section will provide a total of current through the first, second and third resistances which provides a reading on the differential ammeter corresponding to the volume of the gas in said flow line section.

3. In an apparatus for determining the line pack in gas flow line sections at selected input and output pressures comprising, an electric circuit having connected conductors, meters and resistances arranged to simulate pressure and flow conditions in the flow line section in which the pack is to be determined, a power source connected to said circuit, means in the circuit for adjusting the voltage applied to said circuit to a desired constant D.C. voltage, first and second voltage dividers in said circuit, first and second voltmeters connected across the output of the first and second voltage dividers respectively to indicate the voltage of said respective outputs, said voltmeters each being calibrated in pressure in pounds per square inch whereby said meters each provide reading in pressure proportionate to the voltage output of the respective voltage dividers, first, second and third resistances, means connecting the first and second resistances to the output of the voltage dividers, means connecting the third resistance in the circuit whereby said constant D.C. voltage is applied thereto, a differential ammeter calibrated in millions of cubic feet and in the circuit between the constant voltage source and the first, second and third resistances to measure the sum of the currents from the first and second resistances less the current from the third resistance, said first, second and third resistances being of values that are electrical counterparts of factors involved in the capacity of said flow line section whereby setting of the first and second voltage dividers to provide readings on the first and second voltmeters corresponding to the input and output pressures respectively of the flow line section will provide a total of current through the first, second and third resistances which provides a reading on the differential ammeter corresponding to the volume of the gas in said flow line section, a second differential ammeter calibrated in millions of cubic feet and having a scale whereby it will read a gain or loss of total amperage of current applied thereto, switch means connecting the first and second resistances to said second ammeter for applying the sum of the current from said first and second resistances to said second ammeter, and means connecting the power source to said second ammeter and having a variable resistance to vary the current therefrom to said second ammeter whereby said second ammeter may be adjusted to a zero reading and then show plus and minus changes in the total current responsive to change in voltage from the first and second voltage dividers to said first and second resistances to simulate the change in the volume of gas in the flow line section resulting from change in the input and output pressures of said flow line section.

4. In an apparatus for determining the line pack in gas flow line sections at selected input and output pressures comprising, an electric circuit having connected conductors, meters and resistances arranged to simulate pressure and flow conditions in each of a plurality of flow line sections in which the pack is to be determined, a power source connected to said circuit for applying a desired constant D.C. voltage, first and second voltage dividers in said circuit for each flow line section, first and second voltmeters, means selectively connecting said first and second voltmeters across the output of the first and second voltage dividers respectively for each flow line section to indicate the voltage of said respective outputs thereof, said voltmeters each being calibrated in pressure in pounds per square inch whereby said meters each provide reading in pressure proportionate to the voltage output of the respective voltage dividers, first, second and third resistances for each of the flow line sections, means selectively connecting the first and second resistances to the output of the respective voltage dividers for the respective flow line section, means connecting the third resistance for the respective flow line section in the circuit whereby said constant D.C. voltage is applied thereto, a differential ammeter calibrated in millions of cubic feet and in the circuit between the constant voltage source and the first, second and third resistances to measure the sum of the currents from the first and second resistances less the current from the third resistance of the respective flow line section, said first, second and third resistances for the respective flow line section being of values that are electrical counterparts of factors involved in the capacity of said respective flow line section whereby setting of the first and second voltage dividers to provide readings on the first and second voltmeters corresponding to the input and output pressures respectively of said flow line section will provide a total of current through the first, second and third resistances which provides a reading on the differential ammeter corresponding to the volume of the gas in said respective flow line section, and means connecting the first and second voltage dividers and first, second and third resistances for a plurality of the respective flow line sections in circuit with said differential ammeter to simultaneously apply the sum of the currents from the respective first and second resistances less the currents from the respective third resistances of said plurality of flow line sections whereby said differential ammeter will show the total volume of gas in said plurality of flow line sections.

References Cited in the file of this patent

UNITED STATES PATENTS

| | | |
|---|---|---|
| 2,603,415 | Silverman et al. | July 15, 1952 |
| 2,695,750 | Kayan | Nov. 30, 1954 |
| 2,924,384 | Porter | Feb. 9, 1960 |

FOREIGN PATENTS

| | | |
|---|---|---|
| 737,888 | Germany | July 28, 1943 |

OTHER REFERENCES

Electrical Communications Experiments (Reed et al.), 1952, p. 13.

Analog Methods in Computation and Simulation (Soroka), 1954, pages 112–114.

Stephenson et al.: "The Use of Electric Network Analyzers for Pipe Network Analysis," Communications and Electronics, January 1954, pp. 857–861.